United States Patent [19]

Euzen et al.

[11] Patent Number: 5,823,761
[45] Date of Patent: Oct. 20, 1998

[54] PROCESS FOR CATALYTIC COMBUSTION WITH STAGED FUEL INJECTION

[75] Inventors: Patrick Euzen, Rueil Malmaison; Jean-Herve Le Gal, Paris; Gerard Martin, Rueil Malmaison, all of France

[73] Assignee: Institut Francais du Petrole, Rueil Malmaison, France

[21] Appl. No.: 783,167

[22] Filed: Jan. 14, 1997

[30] Foreign Application Priority Data

Jan. 15, 1996 [FR] France ................................... 96/00513

[51] Int. Cl.$^6$ ....................................................... F23B 7/00
[52] U.S. Cl. ........................... 431/7; 423/245.3; 423/247; 423/248
[58] Field of Search ................................... 431/2, 7, 170; 423/245.3, 248, 247; 502/302, 304, 324, 325, 326, 340, 341

[56] References Cited

U.S. PATENT DOCUMENTS

| | | | |
|---|---|---|---|
| 4,220,559 | 9/1980 | Polinski | 252/455 R |
| 4,378,307 | 3/1983 | Brunelle et al. | 252/455 R |
| 4,731,989 | 3/1988 | Furuya et al. | 60/39.05 |
| 4,788,174 | 11/1988 | Arai et al. | 502/324 |

(List continued on next page.)

FOREIGN PATENT DOCUMENTS

| | | |
|---|---|---|
| 0 125 565 A2 | 11/1984 | European Pat. Off. . |
| 0 198 948 A2 | 10/1986 | European Pat. Off. . |
| 0 259 758 A2 | 3/1988 | European Pat. Off. . |
| 2-721837A1 | 1/1996 | France . |

(List continued on next page.)

OTHER PUBLICATIONS

Reay "Catalytic Combustion: Current Status and Implications for Energy Efficiency in the Process Industries" *Heat Recovery Systems and CHP* vol. 13 No. 5 pp. 383–390 1993. No month.

Hanakata et al. "A Study on Combustion Catalysis For a Gas Turbine" *Studies in Surface Sci. and Catalysis* Advisory Editors: Delmon et al. vol. 92 pp. 437–440, Sci. and Tech. in Catalysis 1994, Proceedings of the 2nd. Tokyo Conference on Advanced Catalytic Science and Tech., Tokyo Japan, Aug. 21–26 1994, Elsevier. 1995 No month.

(List continued on next page.)

*Primary Examiner*—Gary P. Straub
*Assistant Examiner*—Timothy C. Vanoy
*Attorney, Agent, or Firm*—Millen, White, Zelano & Branigan, P.C.

[57] ABSTRACT

Described is a process of catalytic combustion with staged fuel injection that comprises: a first injection of fuel and air, the passage of the air-fuel mixture that is formed into a catalytic zone, and a second fuel injection into the flow of output from said catalytic zone; with said process being characterized in that said catalytic zone comprises at least one catalyst that comprises a monolithic substrate, a porous support based on a refractory inorganic oxide, and an active phase that comprises cerium, iron, and optionally zirconium, as well as at least one metal that is selected from the group that is formed by palladium and platinum; the content of porous support is between 100 and 400 g per liter of catalyst; the cerium content is between 0.3 and 20% by weight relative to the porous support; the zirconium content is between 0 and 20% by weight relative to the porous support; with the iron content being between 0.01 and 3.5% by weight of iron relative to the porous support; and the palladium and/or platinum content is greater than 3 g per liter of catalyst.

The process that uses such a catalyst produces improved performance levels by avoiding the fluctuating nature of combustion and the deactivation of the catalyst.

17 Claims, 3 Drawing Sheets

U.S. PATENT DOCUMENTS

| | | | |
|---|---|---|---|
| 4,793,797 | 12/1988 | Kato et al. | 431/7 |
| 4,857,499 | 8/1989 | Ito et al. | 502/326 |
| 4,959,339 | 9/1990 | Arai | 502/302 |
| 5,332,554 | 7/1994 | Yasaki et al. | 422/180 |
| 5,643,543 | 7/1997 | Guibard et al. | 423/213.5 |

FOREIGN PATENT DOCUMENTS

| | | |
|---|---|---|
| 2 726 774 A1 | 5/1996 | France . |
| 2 742 680 A1 | 6/1997 | France . |
| 4-197443 A | 7/1992 | Japan . |
| WO92/09848 | 6/1992 | WIPO . |
| WO92/09849 | 6/1992 | WIPO . |
| WO94/20789 | 9/1994 | WIPO . |

OTHER PUBLICATIONS

Patent Abstracts of Japan, JP60202206, vol. 10, No. 55, (M–458), May 3, 1986.

Patent Abstracts of Japan, JP61195215, vol. 11, No. 21, (M–555), Jan. 21, 1987.

Patent Abstracts of Japan, JP61033233, vol. 10, No. 185, (C–357), Jun. 27, 1986.

Jones and Salfati, "Combustion catalytique et gaz naturel", *Revue Generale de Thermique*, 28:330–331, Jun.–Jul., 1989. pp. 401–406.

PROCESS FOR CATALYTIC COMBUSTION WITH STAGED FUEL INJECTION

BACKGROUND OF THE INVENTION

This invention relates to a process for catalytic combustion with staged injection that uses a non-selective oxidation catalyst.

Conventional combustion, which is carried out in the presence of a flame and is commonly used in processes for combustion of hydrocarbons, such as natural gas, is a process that is difficult to monitor. It takes place in a well-defined range of air/hydrocarbon concentrations and, in addition to the formation of carbon dioxide and water, leads to the production of pollutants such as carbon monoxide and nitrogen oxides.

Because of the steady tightening of environmental constraints on pollutants (nitrogen oxides, unburned hydrocarbons, carbon monoxide) that are emitted by combustion processes, it is becoming necessary to find new technologies that allow the emissions of the latter to be greatly reduced. Several conventional solutions are well known to one skilled in the art:

The selective reduction of exhaust gases (in abbreviated form S.C.R. for "Selective Catalytic Reduction"). The selective reduction of nitrogen oxides by ammonia makes it possible to reduce the $NO_x$ contents to about 10 ppm. This solution, however, requires the installation of a special reactor and the storage and use of ammonia; the costs for installing and operating S.C.R. are therefore high.

The injection of water or water vapor. Such an injection lowers the temperature that is reached by the combustion gases, thus significantly reducing the $NO_x$ contents to about 50 ppm. The cost of adding such a device is low. The costs of operating such an installation are high, however, because of purifying the water prior to injection and because of the increased consumption of fuel caused by a reduction in energy output. Also, although the injection of water is sufficient to meet current standards, it will not make it possible to satisfy future standards for $NO_x$.

A primary zone with a lean mixture. This technology is based on improving the homogeneity of the air/fuel mixture. It makes it possible to cut the $NO_x$ emissions to about 50 ppm, but this reduction is made to the detriment of the emissions of carbon monoxide and unburned hydrocarbons, which are increased.

Catalytic combustion is an appealing solution to meet the tightened standards on pollutants. Actually, it is advantageous to replace the conventional burners with the catalytic combustion chamber because it allows better monitoring of overall oxidation in a wide range of values of the air/hydrocarbon ratio, thus greatly reducing the emissions of nitrogen oxides, unburned hydrocarbons, and carbon monoxide. It can also be mentioned that it makes it possible to burn a very wide variety of compounds.

As D. Reay describes them in particular in "Catalytic Combustion: Current Status and Implications for Energy Efficiency in the Process Industries, Heat Recovery Systems & CHP, 13, No. 5, pp. 383–390, 1993" and as D. Jones and S. Salfati describe them in "Rev. Gén. Therm. Fr. No. 330–331, pp. 401–406, June-July 1989," the applications of catalytic combustion are many: radiant panels and pipes, catalytic hot plates, gas turbines, cogeneration, burners, catalytic sleeves for steam reforming pipes, production of hot gases in the range of heating by direct contact, and reactors with catalytic plates.

Regarding the catalytic combustion processes in the ranges of energy production and cogeneration, the most widely used reactor configuration is a reactor that comprises several catalytic zones: with the initial catalyst being more specifically dedicated to triggering the combustion reaction and the subsequent ones being used to stabilize the combustion reaction at high temperature; with the number of catalytic stages (or zones) being adjusted depending on the conditions that are imposed by the application in question.

Combustion catalysts are generally prepared from a monolithic substrate, made of ceramic or metal, on which is deposited a fine support layer that consists of one or more refractory oxides with a surface area and pores that are larger than those of the monolithic substrate. The active phase, which consists primarily of metals from the platinum group, is dispersed on this oxide.

As is known to one skilled in the art, the metals from the platinum group exhibit the highest catalytic activity for the oxidation of hydrocarbons and therefore trigger combustion at a lower temperature than the transition metal oxides. They are therefore preferably used in the first catalytic zones. Because of the high temperatures that are reached either during start-up phases or under steady-state conditions, however, these catalysts undergo degradation which reduces their catalytic performance levels. The sintering of the support with an alumina base, as well as the sintering of the active metallic phase and/or its encapsulation by the support, are among the factors most commonly cited to explain this degradation.

It is known that it is possible to stabilize effectively the drop in specific surface area of supports with an alumina base by a suitable dopant. The rare earths and silica are often cited among the highest-performing stabilizers of alumina. Catalysts that are prepared by this technique are described in, among others, patent U.S. Pat. No. 4,220,559. In this document, the catalyst comprises metals from the group of platinum or transition metals that are deposited on the alumina, an oxide of a metal that is selected from the group that consists of barium, lanthanum and strontium, and an oxide of a metal that is selected from the group that consists of tin, silicon, zirconium and molybdenum.

Further, to limit the sintering of the active metallic phase, it has been proposed that various stabilizers with a base primarily of transition metal oxides be added.

Thus, in U.S. Pat. No. 4,857,499, the catalyst comprises a porous support whose pore diameter is between 150 and 300 Å and whose proportion by weight relative to the substrate is preferably between 50 and 200 g/l, with an active phase including at least 10% by weight, relative to the porous support, of a precious metal that is selected from the group that is formed by palladium and platinum; with a first promoter including at least one element that is selected from the group that consists of lanthanum, cerium, praseodymium, neodymium, barium, strontium, calcium and their oxides, whose proportion by weight relative to the porous support is between 5 and 20%; with a second promoter including at least one element that is selected from the group that is formed by magnesium, silicon and their oxides whose proportion by weight relative to the active phase is less than or equal to 10%; and a third promoter that includes at least one element that is selected from the group that consists of nickel, zirconium, cobalt, iron and manganese and their oxides, whose proportion by weight relative to the active phase is less than or equal to 10%. Said catalyst also can be deposited on a monolithic substrate that belongs to the group that is formed by cordierite, mullite, alpha-aluminum, zirconia and titanium oxide; with the proportion by weight of porous support relative to the volume of substrate being between 50 and 200 g/l.

In U.S. Pat. No. 4,793,797, the catalyst comprises an inorganic support that is selected from the group that consists of the oxides, carbides and nitrides of elements that belong to groups IIa, IIIa and IV of the periodic table or is selected from the group that consists of La-β-Al$_2$O$_3$, Nd-β-Al$_2$O$_3$, Ce-β-Al$_2$O$_3$ or Pr-β-Al$_2$O$_3$, at least one precious metal that is selected from the group that consists of palladium, platinum, rhodium and ruthenium, and at least one oxide of a metal with a base that is selected from the group that consists of magnesium, manganese, cobalt, nickel, strontium, niobium, zinc, tin, chromium and zirconium, such that the atomic ratio of the base metal to the precious metal is between 0.1 and 10.

Furthermore, as far as the formulations that can work at high temperature are concerned, mixed oxides are generally more resistant than precious metals. Among the oxides, perovskites and more particularly LaMnO$_3$, LaCoO$_3$ and La$_{1-x}$Sr$_x$MnO$_3$, where $0 \leq x \leq 0.2$, are advantageous for the catalytic oxidation of hydrocarbons, but their surface area drops off quickly when the temperature exceeds 800° C. H. Arai et al. proposed formulations with a hexaaluminate base that contains manganese, thus striking a good catalytic activity/thermal stability compromise, as described in particular in U.S. Pat. No. 4,788,174. The catalytic combustion catalyst proposed can be shown by formula: A$_{1-z}$C$_z$B$_x$Al$_{12-y}$O$_{19-\alpha}$, in which A is at least one element that is selected from the group that is formed by Ba, Ca and Sr with ($0 \leq z \leq 0.4$);

B is at least one element that is selected from the group that is formed by Mn, Fe, Co, Ni, Cu and Cr with ($x \leq y \leq 2x$);

C is K and/or Rb; and $\alpha = 1\frac{1}{2}\{X-z(X-Y)+xZ-3Y\}$ where X, Y and Z respectively represent the valences of elements A, C and B.

H. Arai et al. also proposed adding a precious metal to such catalysts, as described in particular in U.S. Pat. No. 4,959,339. The catalyst that is thus proposed is represented by the formula:

in which

A is at least one element that is selected from the group that is formed by Ba, Ca and Sr with ($0 \leq z \leq 0.4$);

B is at least one element that is selected from the group that is formed by Mn, Fe, Co, Ni, Cu and Cr with ($x \leq y \leq 2x$);

C is at least one element that is selected from the group that is formed by K, Rb and rare earths;

D is at least one element that is selected from the group that is formed by Au, Ag, Pd, Pt and other precious metal from the group of platinum with $x+u \leq 4$; and $\alpha = 1\frac{1}{2}[X-z(X-Y)+xZ+uU-3y-3u\}$ where X, Y, Z and U represent, respectively, the valences of elements A, C, B and D.

Among the patents that are particularly representative of combustion reactors with several catalytic zones, there can be cited in particular:

European Patent Application EP-A-198 948, which uses
  in the first catalytic zone: Pd and Pt and NiO; and
  in the second catalytic zone: Pt and Pd;

Japanese Patent Application JP-A-04/197 443, which uses
  in the first catalytic zone: Pd and/or Pt;
  in the second catalytic zone: Sr$_{0.8}$La$_{0.2}$MnAl$_{11}$O$_{19-\alpha}$;
  in the third catalytic zone: Sr$_{0.8}$La$_{0.2}$MnAl$_{11}$O$_{19-\alpha}$;

International Patent Applications WO-A-92/9848 and WO-A-92/9849, which use
  in the first catalytic zone: Pd and (Pt or Ag);
  in the second catalytic zone: Pd and (Pt or Ag); and
  in the third catalytic zone: perovskite ABO$_3$ or a metal oxide from group V (Nb or V), group VI (Cr), or group VIII (Fe, Co, Ni).

The critical point of the multi-stage process lies in the monitoring of the temperature within various catalytic stages. If the combustion reaction goes out of control, the temperature of the catalyst can quickly reach the adiabatic flame temperature. It is important, however, to cover the entire load range of the gas turbine. From the ignition process to full load passing through slow-down, the air-fuel ratio can vary within large proportions. It may therefore prove difficult to use such a catalytic combustion chamber.

Furthermore, U.S. Pat. No. 4,731,989 of Furuya et al., which describes a combustion process that comprises staged fuel injection as a main characteristic, is known. This so-called "hybrid" process consists of a catalytic zone where a fraction of fuel is burned, with this catalytic zone being followed by a post-combustion zone in the homogeneous phase, where the remainder of the fuel is mixed with hot gases exiting the catalyst downstream from the latter and is burned in the form of a premixed flame. The air/fuel ratio of the mixture that enters the catalytic zone is adjusted in such a way that the adiabatic temperature of the gases does not exceed about 1000° C. at the outlet of this catalytic zone. The remainder of the mixture is injected downstream from the catalytic zone to reach a combustion gas temperature that is compatible with the requirements of the current combustion processes or 1200° to 1500° C. Because of the limitation of temperatures of materials to 1000° C., the catalyst does not undergo deactivation.

This process is advantageous to the extent that it offers greater safety than that of the process where the monitoring of temperature is done just by the configuration of the monolith or the group of monoliths. In the start-up phases, it is also more flexible to use.

More recently, however, in an article by Hanakata et al., "A Study on Combustion Catalyst for Gas Turbine," Second Tokyo Conference on Advanced Catalytic Science and Technology (TOCAT), Tokyo, August 21–26, 1994, pages 437–440, the authors indicate that the catalytic activity of a catalyst with a palladium base fluctuates between 800° C. and 1000° C. because of the equilibrium ⇌Pd+½O$_2$. This unstable behavior of palladium is observed during operation in such a staged injection combustion reactor; Furuya et al. add that if this instability problem of the formulations with a palladium base can be resolved, a catalyst with a palladium base will be particularly well suited for this staged injection process.

A global approach to the catalytic combustion process taking into account both the advantages and the drawbacks of the configuration of the catalytic reactor and the catalytic formulation therefore becomes imperative. And, despite the numerous improvements already made, it remains advantageous to seek a combination between the configuration of the increasingly strict catalytic reactor and the catalytic formulation that meets the requirements of the combustion process.

According to French Patent Application FR-A-2726774 in the name of the same applicant firm, combustion catalysts that comprise iron and cerium that are combined with palladium and/or platinum, deposited on a refractory inorganic oxide, are also known. Another French patent application, also filed by the applicant firm, on Dec. 22, 1995, under number E.N. 95/15341, describes the combustion catalysts that comprise cerium, iron as well as zirconium combined with palladium and/or with platinum, deposited on a refractory inorganic oxide.

The research done by the applicant firm has led it to discover that, surprisingly enough, a catalytic combustion staged-injection process whose catalytic zone comprises a catalyst that contains both iron, cerium, optionally zirconium and precious metals from the platinum group, while eliminating the drawbacks of prior art, appear to exhibit remarkable stability not only during operation but also during successive start-ups.

SUMMARY OF THE INVENTION

This invention therefore proposes a process for catalytic combustion with staged fuel injection that comprises: a first injection of fuel and air and the passage of the air-fuel mixture that is formed into a catalytic zone; and a second injection of fuel into the output flow from said catalytic zone; with said process being characterized in that said catalytic zone comprises at least one catalyst that comprises a monolithic substrate, a porous support based on a refractory inorganic oxide, and an active phase that comprises cerium, iron, and optionally zirconium, as well as at least one metal that is selected from the group that is formed by palladium and platinum; the content of porous support is between 100 and 400 g per liter of catalyst; the cerium content is between 0.3 and 20% by weight relative to the porous support; the zirconium content is between 0% and 20% by weight relative to the porous support; with the iron content being between 0.01 and 3.5% by weight of iron relative to the porous support; and the palladium and/or platinum content is greater than 3 g per liter of catalyst.

According to even more preferred characteristics of said catalyst of the catalytic zone of the process of this invention, the content of porous support is between 200 and 350 g per liter of catalyst; the cerium content is between 2 and 15% by weight relative to the porous support; the iron content is between 0.1 and 2% by weight relative to the porous support; the zirconium content is between 2 and 15% by weight relative to the porous support; and the palladium and/or platinum content is between 5 and 15 g per liter of catalyst.

The flow of fuel that is injected into the air upstream from the catalytic zone is also generally such that the temperature of the catalyst of said zone is less than about 1000° C. and that the temperature of the gases at the output of said catalytic zone is less than about 1000° C.

The maximum temperature that is reached by the gases at the outlet of the catalytic zone ($T_{maxoutlet}$) is equal to the sum of the initial temperature of the gases in the catalytic zone ($T_{initial}$) and the temperature that is generated by the combustion of fuel ($\Delta T_{adiabatic}$). Thus, when the initial temperature of the air-fuel mixture in the catalytic zone is on the order of 500° C., about two-thirds of the necessary flow of fuel mixed with the air that is upstream from the catalytic zone and the one-third remaining during the second injection are injected into the output flow from the catalytic zone.

As indicated above, the content of porous support of the catalytic zone catalyst of the staged-injection process of this invention varies between 100 and 400 g per liter of catalyst but even more preferably between 200 and 350 g/l. If the content of porous support is less than 100 g, the catalytic activity is not sufficient. Conversely, a content of porous support that is greater than 400 g/l is also harmful to catalytic activity because it causes clogging of the channels of the monolith.

In the catalysts that are used in the process according to the invention, the monolithic substrate can consist of a monolith with a ceramic or metallic cellular structure (coil, stack of metal strips or else joining of metallic fibers or metallic wires in the form of a monolith with a fibrous structure). The ceramic used can be mullite, cordierite, alumina-α, zirconia, alumina titanate, silicon carbide, silicon nitride, or mixtures thereof. These monolithic substrates are produced by extrusion. The metal alloys that are used should preferably exhibit refractory properties. They can consist of, for example, compounds of iron, chromium, aluminum and cerium or yttrium, such as Gilphal 135® steel from the IMPHY company. The metallic substrate can be previously subjected to oxidizing treatment at a temperature of between 700° C. and 1200° C., preferably between 800° and 1000° C. The cell density, i.e., the number of cells per monolith section, is generally between 50 and 600 cells per square inch (7.75 to 93 cells per $cm^2$).

The preparation and shaping of the support can constitute the first stage of the preparation of these catalysts. The support based on a refractory oxide that is used according to the invention is generally selected from the group that is formed by the refractory oxides of the metals of groups IIa, IIIa, IVa and IVb of the periodic table and mixtures thereof in all proportions.

Most often, aluminum oxides of general formula $Al_2O_3$, $nH_2O$ are used. Their specific surface area is between 10 and 500 $m^2/g$. The oxides in which n is between 0 and 0.6 are conventionally obtained by controlled dehydration of hydroxides in which $1 \leq n \leq 3$. These hydroxides are themselves prepared by precipitation of aluminum salts by bases or acids in an aqueous medium. The conditions of precipitation and curing determine several forms of hydroxides, the most common of which are boehmite (n=1), gibbsite and bayerite (n=3). Depending on the hydrothermal treatment conditions, these hydroxides provide several transition oxides or aluminas. The alpha, delta, eta, gamma, kappa, khi, rho and theta forms are thus cited. The latter differ primarily by the organization of their crystalline structures. During heat treatment, these various forms are able to develop between one another, according to a complex relationship which depends on the operating conditions of the treatment. The alpha form which exhibits a very low specific surface area is stable at the highest temperature. It is preferred to use aluminas that exhibit a specific surface area between 20 and 250 $m^2/g$ and in particular gamma and/or delta alumina.

To increase the thermal stability of this oxide or these oxides, various compounds can be incorporated in the porous support, either directly in the form of pigments or in the form of oxide precursor compounds. The oxides of rare earths, the oxides of alkaline-earth metals and silica, which are among the highest-performing stabilizers of alumina, can be advantageously incorporated into the porous support. The silica is preferably used, for example, at a content of 1% and 5% by weight relative to the porous support.

The metal content of the group that consists of platinum and palladium of the catalyst that is used in the invention is preferably greater than 3 g per liter of catalyst and even more preferably between 5 and 15 g per liter of catalyst. If the precious-metal content is less than 3 g, the catalytic activity is not high enough to meet the requirements of a combustion process. However, when the precious-metal content exceeds 20 g, a further increase in the precious metal content does not make it possible to increase catalytic activity significantly. According to the invention, palladium is preferred. Platinum, however, can be advantageously used for a combustion stage that operates at relatively low temperatures, for example at about 500° C. or in combination with palladium.

The presence of iron and cerium that are deposited simultaneously on the refractory inorganic oxide or oxides makes it possible to improve the activity and stability of the catalyst of this invention over time. Zirconium can also enhance this effect of synergy.

The cerium content of the catalyst of the catalytic zone of the process according to the invention is preferably between 0.3 and 20% by weight relative to the support, and even more preferably between 2 and 15% by weight relative to the porous support. If the cerium content is less than 0.3%, the latter does not satisfactorily promise catalytic activity. Conversely, when the cerium content exceeds 20% by weight relative to the porous support, a further increase in the cerium content does not make it possible to increase the catalytic activity significantly.

The iron content of the catalyst of the catalytic zone of the process of this invention is between 0.01 and 3.5% by weight relative to the support and more particularly between 0.1 and 2%. If the iron content exceeds 3.5%, the iron then can greatly accelerate the drop in specific surface area of the porous support with an alumina base.

The zirconium content of the catalyst of the catalytic zone of the process according to the invention is preferably between 0 and 20% by weight of porous support, and even more preferably between 2 and 15% by weight relative to the porous support. When the zirconium content reaches 20% by weight relative to the porous support, a further increase in the zirconium content does not make it possible to increase catalytic activity significantly.

The preparation of the catalyst of the catalytic zone of the process according to the invention that is deposited on a substrate consists of a coating stage during which the substrate is immersed in a suspension that contains the precursors of the components of the catalyst, then is dried and calcined after excess suspension is evacuated. A second so-called impregnation stage makes it possible to deposit the active metals. For this purpose, the coated substrate is brought into contact with one or more solutions of the precursor or precursors of the active metals. After having been optionally drained, the thus coated and impregnated substrate is dried and subjected to heat treatment.

The deposition of cerium, iron and optionally zirconium on the catalyst support that is used in this invention can be done according to any to the techniques that are known to one skilled in the art and can occur at any time during the preparation of the catalyst. These elements can be introduced in the form of solid compounds (oxides, hydroxides, carbonates, hydroxycarbonates or else insoluble salts) or soluble compounds (nitrates, sulfates, chlorides, alcoholates) into the coating suspension and/or pre-impregnated on one of the components of the coating suspension and/or deposited on the porous support before the impregnation of noble metals and/or co-impregnated with these metals according to the technique being considered. In the case where cerium, iron and optionally zirconium are deposited after the shaping of aluminas that optionally contain other metals, the methods that are used can be, for example, dry impregnation, impregnation by excess solution, or ion exchange. On an already shaped support, a preferred method of introduction of the noble metal is impregnation in an aqueous medium by using excess solution. To eliminate the impregnation solvent, this impregnation is followed by drying and calcination under air at a temperature of between 300° and 900° C.

According to a particular implementation, the support is successively impregnated with a solution that contains compounds that contain cerium, iron and optionally zirconium, then with one or more solutions that contain compounds of the precious metals that are desired to be introduced.

As compounds of cerium, iron and zirconium that can be used, particularly the salts of cerium, iron and zirconium, and more particularly cerous nitrate, cerous acetate, cerous chloride and ammoniacal ceric nitrate, ferric nitrate, ammoniacal iron citrate and ferric chloride, and zirconyl nitrate and zirconium tetrachloride will be cited.

The precursors of the metals of the group that is formed by platinum and palladium are those that are conventionally used for the preparation of catalysts, in particular chlorides, chlorinated complexes, nitrates, amino complexes, and acetylacetonates. As examples, chloroplatinic acid, palladium chloride, tetraamine platinum chloride, dinitrodiaminoplatinum, and palladium nitrate can be cited.

The depth of impregnation can be advantageously regulated by using methods that are known to one skilled in the art and in particular by adding a certain amount of mineral or organic acid to the solution of precious metals. Nitric, hydrochloric, and hydrofluoric acids or acetic, citric, and oxalic acids are commonly used.

In the process of the invention, it should be understood that the catalytic zone can consist of several successive monoliths.

The process of catalytic combustion with staged injection whose catalytic zone comprises a catalyst as described above provides improved performance levels, especially in the processes of catalytic combustion of hydrocarbons such as methane, carbon monoxide, hydrogen, or mixtures thereof. They can also be used, however, in all of the catalytic processes that require high temperatures.

A monolithic element can also be placed downstream from the injection zone to stabilize the combustion. As described above, this monolithic element can consist of a monolith with a ceramic or metallic cellular structure (coil, stack of metal strips or else joining of metallic fibers or metal wires in the form of a monolith with a fibrous structure).

Furthermore, this additional monolithic element can be covered with a catalyst, preferably selected from among the hexaaluminates.

Advantageously, said catalyst basically corresponds to the formula in French Patent Application FR-A-2 721 837 in the name of Institute Francais du Pétrole $A_{1-x}B_yC_zAl_{12-y-z}O_{19-\delta}$, in which A represents at least one element of valence X that is selected from the group that is formed by barium, strontium, and rare earths; B represents at least one element of valence Y that is selected from the group formed by Mn, Co and Fe; C represents at least one element that is selected from the group formed by Mg and Zn; with x having a value of 0 to 0.25, with y having a value of 0.5 to 3 and with z having a value of 0.01 to 3; with the sum of y+z having a maximum value of 4, and $\delta$ has a value which, determined depending on respective valences X and Y of elements A and B and values of x, y and z, is equal to $1\frac{1}{2}\{(1-x)X+yY-3\ y-z\}$.

The following examples illustrate the invention without, however, limiting it; Examples 1 to 4 are provided by way of comparison.

EXAMPLE 1 (Comparison)

The catalytic zone consists of three cordierite monolith sections, whose cell density is equal to 350 cells/square inch or about 54.25 cells/cm$^2$, juxtaposed inside a jacket. The walls of the channels of the monolith sections have a thickness of 0.14 mm. Each monolith section has a length of 5 cm and a diameter of 20 cm. Each of the sections is coated with 120 g/l of an alumina formulation that is stabilized according to the preparation method that is described in Example 14 of French Patent Application FR-A-2 726 774. Each of the monolith sections is then impregnated with palladium nitrate to deposit 3% by weight of palladium relative to the porous support.

The performance levels of the processes are compared for the combustion reaction of methane, a main component of natural gas.

The air which comes to the first monolith section is preheated to 380° C. at a pressure of 15 bar. The fuel that is injected upstream from the first monolith section is methane such that VVH, which is defined as the ratio of the volume flow of gas to the catalyst volume, is equal to 500,000 h$^{-1}$. The natural gas content varies from 2% to 3.5%. The methane concentration at the intake and at the outlet of the reactor is determined with the help of a flame ionization detector (analyst JUM ENGINEERING, FID 3-300 model). The conversion of methane is the ratio in percentage between the difference of methane concentration between the intake and the outlet and the initial concentration. After an increase in temperature during reaction mixing, the initial temperature of the reaction mixture is set at 500° C.; the conversion of the methane is measured under steady-state conditions. The period is adjusted to discriminate the process configurations significantly depending on their ability to stabilize the combustion of the methane.

Figure 1:
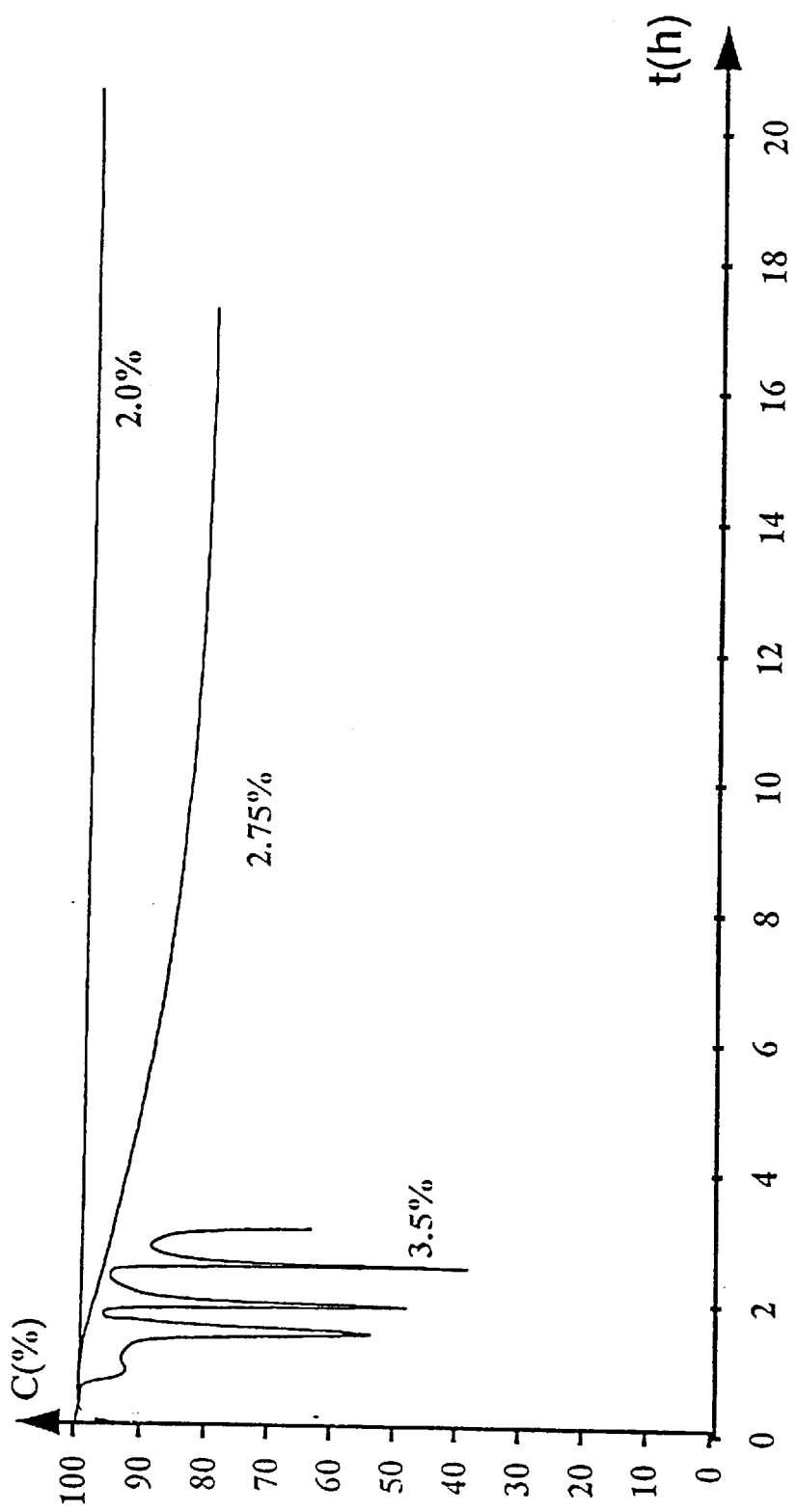
FIG. 1 depicts the variation of the conversion into methane as a function of elapsed time according to the methane content for the process according to Example 1.

FIG. 1 shows the variation of the conversion of the methane for this catalyst for three different methane contents: 2%, 2.75%, and 3.5%. It shows that the deactivation of the catalyst is faster, the higher the methane content: at 2%, the conversion is greater than 98% at the end of 20 hours; at 2.75%, it is no more than 80% after 16 hours; finally at 3.5%, conversion drops quickly at the end of about one hour, and then it begins to fluctuate between 40 and 95% of conversion. The palladium deactivates faster (FIG. 1) the higher the methane content because an increase in the latter, from 2 to 3.5% in air, induces a higher operating temperature. At 3.5% methane, the temperature profile inside the catalyst is much steeper than at 2% and 2.75% and the catalyst experiences temperatures that are greater than 1000° C. As soon as the temperature of the catalyst exceeds 900° C., however, the palladium oxide transforms into metallic palladium and conversion drops. In contrast, at 2% methane, the temperature of the catalyst does not reach 900° C. in the first centimeter section of the monolith. This initial section of the monolith therefore operates in a temperature zone where decomposition of $PdO \leftrightarrows Pd+½O_2$ does not take place. The deactivation is consequently greatly slowed down since only the sintering of the palladium can cause it. Such behavior—deactivation with fluctuation of catalytic activity—is characteristic of the palladium/methane pair because it is not observed for the same catalyst in the case of the propane with an equivalent content of ppmC. This example emphasizes the specificity of the palladium/methane pair and demonstrates the need to have a "restrained" combustion process, so that the first catalytic stage with a supported palladium base does not experience excessive temperature.

EXAMPLE 2 (Comparison)

To show the combined effect of iron and cerium on catalytic activity, three monolith sections are coated as described above with a coating as described in Example 1 of French Patent Application FR-A-2 726 774.

The monolith is then impregnated with a palladium solution to deposit 3% by weight of palladium relative to the coated porous support or, expressed relative to the catalyst: 3.6 g of palladium per liter of catalyst.

Relative to the porous support, the catalyst thus prepared contains 4.13% by weight of cerium, 1.31% by weight of iron, and 3% by weight of palladium.

The operating conditions are as described in Example 1. The methane content is set at 3.5%. The catalyst exhibits high activity even after fifty hours of operation: conversion remains greater than 95%. The starting temperature, during successive tests, increases considerably, however, rising from 300° to 350° C.

EXAMPLE 3 (Comparison)

The catalytic zone consists of three monolith sections that are identical to those of Example 1, and each of these monolith sections is coated and then impregnated as described in Example 1.

The performance levels of the process are then evaluated for the natural-gas combustion reaction. The air that comes into the first monolith section is preheated to 380° C. at a pressure of 15 bar. The fuel that is injected upstream from this first monolith section is natural gas (sample composition: 98% $CH_4$, 2% $C_2H_6$) so that the VVH, which is defined as the ratio of the gas volume flow to catalyst volume, is equal to 500,000 h$^{-1}$. The natural gas content is set at a richness of 0.3. The flow of air that penetrates the system is equal to 2957 kg/h. The flow of natural gas is equal to 87 kg/h.

Figure 2:
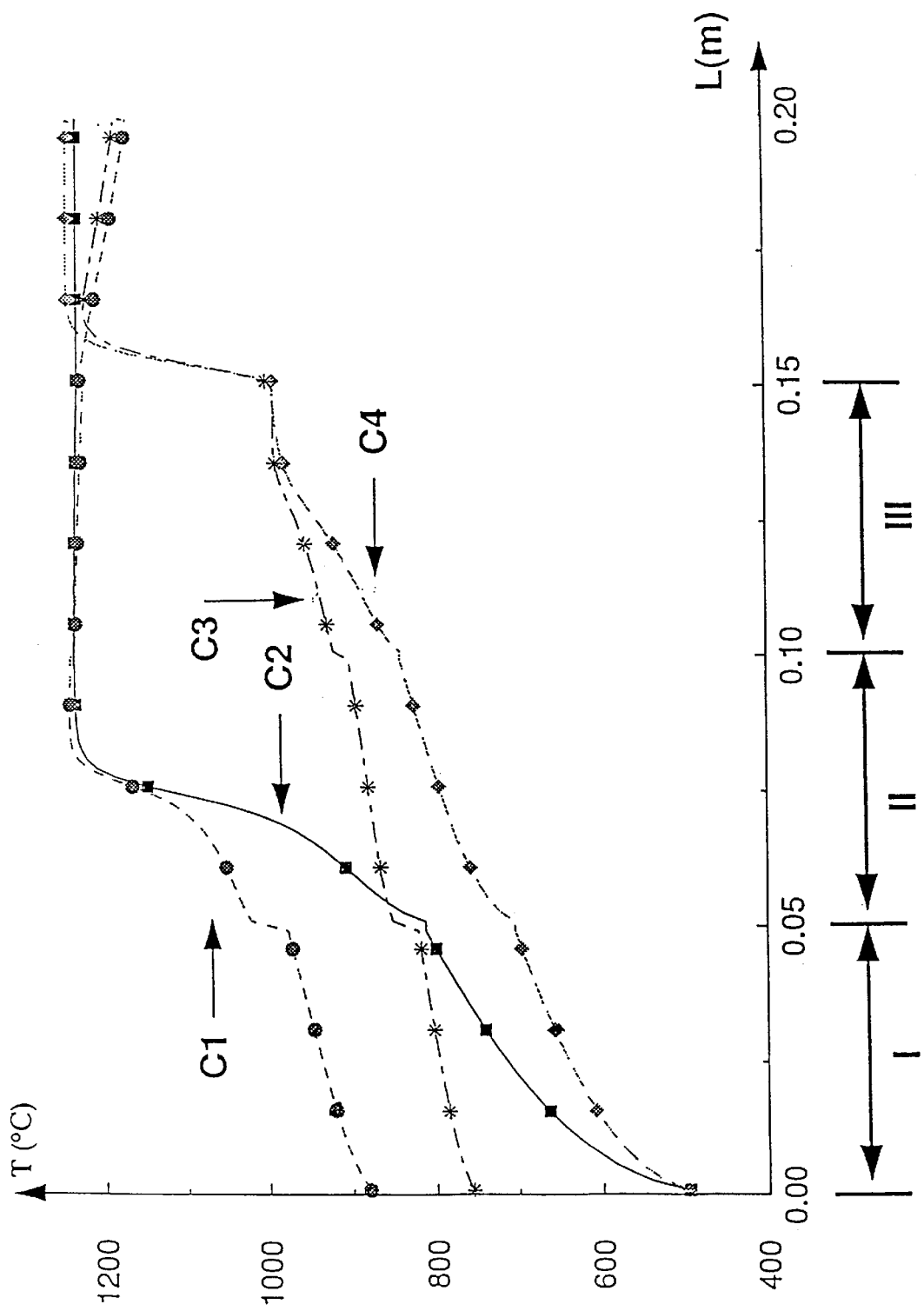
FIG. 2 presents the curves of temperature at various points in the catalytic zone in the implementation of Examples 3 and 4. Said catalytic zone comprises three monolith sections I, II, and III. Distances L (in meters) relate to the intake face of the first monolith section.

Shown in FIG. 2 are curves C1 and C2 of variation of the temperature of the gases and the substrate in the catalytic zone and downstream from the latter.

EXAMPLE 4 (Comparison)

Relative to Examples 1 and 2, the arrangement of the combustion chamber is different. It always consists of three identical monolith sections, but only a portion of the fuel is mixed with the air before the catalytic zone, and the amount of fuel is limited to keep the temperature of the catalyst below 1000° C. The addition of fuel, which is injected into the hot gases of the last catalytic monolith section directly downstream from the latter, makes it possible to obtain auto-ignition of the mixture.

The performance levels of the process are evaluated under the same operating conditions as described in the process of Example 3 for the same richness in fuel or 0.3. The natural gas flow injected before the first monolith section is 58 kg/h, and the remaining 29 kg/h are injected into the hot gases of the last catalytic monolith section directly downstream from the latter.

Shown in FIG. 2 are curves C3 and C4 of variation of the temperature of the gases and the substrate in the catalytic zone and downstream from the latter.

Figure 3:
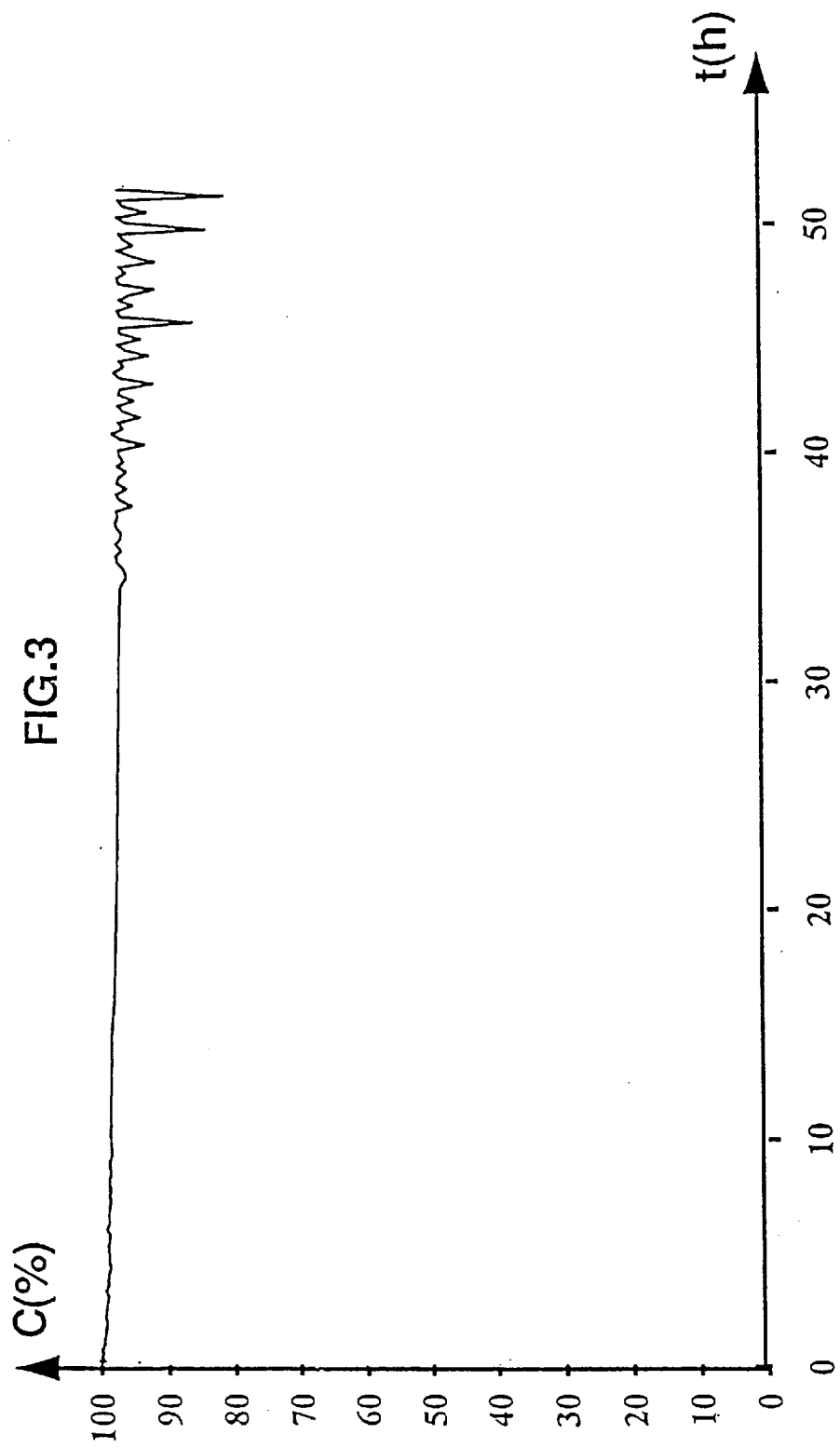
FIG. 3 presents the variation of the conversion into methane as a function of elapsed time depending on the methane content for the process according to Example 4.

Compared to the process that is described in Example 3 with a single fuel injection upstream from the catalytic zone, the improvement noted relates to the temperature of the substrate, which does not exceed 1000° C. (curve C3 of FIG. 2). The deactivation speed is therefore greatly reduced. The third catalytic section, however, is located in a temperature range where equilibrium $PdO \rightleftharpoons Pd + \frac{1}{2}O_2$ is shifted to the right. It follows that the conversion begins to fluctuate at the end of several tens of hours, as shown in FIG. 3. Such fluctuating behavior can be interpreted in the following way: when conversion increases, the temperature of the catalyst exceeds 900° C., and palladium oxide then transforms into less active metallic palladium; conversion drops off, and the metallic palladium reoxidizes. Conversion then again increases. Such fluctuating behavior is consistent with the observations reported in the prior art and more particularly in the article by Furuya et al., "A Study on Combustion Catalyst for Gas Turbine," Second Tokyo Conference on Advanced Catalytic Science and Technology (TOCAT), Tokyo, Aug. 21–26, 1994, pages 437–440.

EXAMPLE 5 (According to the invention)

In this example, the operating conditions are identical to those of the preceding example.

In a first stage, three monolith sections are coated as described above with a coating as described in Example 1 of French Patent Application FR-A- 2 726 774.

In a second so-called impregnation stage, the coated monolith sections are immersed in a palladium nitrate solution so that the amount of palladium that is set after drying and calcination at 500° C. for two hours is 5% by weight of palladium relative to the porous support or, expressed relative to the catalyst: 6 g of palladium per liter of catalyst.

The catalyst that is thus prepared contains by weight, relative to the porous support, 4.13% cerium, 1.31% iron, and 5% palladium. When the staged injection process comprises, in its catalytic zone, such a catalyst, the process operates for 50 hours without either deactivation of the catalyst or the fluctuating behavior described in the prior art being observed. The starting temperature of the combustion also does not vary during successive tests.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The entire disclosure of French application 96/00513, is hereby incorporated by reference.

What is claimed:

1. A process for the catalytic combustion of fuel with staged fuel injection that comprises: a first injection of fuel and air, the passage of the air-fuel mixture into a catalytic zone, and a second injection of fuel into the output gas from said catalytic zone, said process being characterized in that said catalytic zone comprises at least one catalyst that comprises a monolithic substrate, a porous refractory inorganic oxide support and an active phase that comprises (I) cerium, iron, and optionally zirconium, and (II) at least one metal selected from the group consisting of palladium and platinum; the content of the porous support is between 100 and 400 g per liter of catalyst; the cerium content is between 0.3 and 20% by weight relative to the porous support; the zirconium content is between 0 and 20% by weight relative to the porous support; the iron content is between 0.01 and 3.5% by weight of iron relative to the porous support; and the palladium and/or platinum content is greater than 3 g per liter of catalyst, said process being further characterized by the presence of a monolithic element with a ceramic or metallic cellular structure, downstream from the catalytic zone, and wherein the second fuel injection is carried out between the catalytic zone and said monolithic element.

2. A process according to claim 1, wherein the content of the porous support is between 200 and 350 g per liter of catalyst; the cerium content is between 2 and 15% by weight relative to the porous support; the zirconium content is between 2 and 15% by weight relative to the porous support; the iron content is between 0.1 to 2% by weight of iron relative to the support; and the palladium and/or platinum content is between 5 and 15 g per liter of catalyst.

3. A process according to claim 1, wherein the flow of injected fuel into the air upstream from the catalytic zone is such that the temperature of the catalyst of the catalytic zone is less than about 1000° C. and wherein the temperature of gases at the outlet of said zone is less than 1000° C.

4. A process according to claim 1, wherein said porous support is selected from the group consisting of alumina-alpha, alumina-delta, alumina-eta, alumina-gamma, alumina-kappa, alumina-khi, alumina-rho, alumina-theta, silica, silica-aluminas, titanium oxide, zirconia and mixtures thereof.

5. A process according to claim 1, wherein said porous support has a specific surface area of between 20 and 250 $m^2/g$.

6. A process according to claim 1, wherein the porous support is selected from the group consisting of alumina-alpha, alumina-delta, alumina-eta, alumina-gamma, alumina-kappa, alumina-khi, alumina-rho, and alumina-theta.

7. A process according to claim 6, wherein said support has been thermally stabilized by introducing at least one compound that is selected from the group consisting of oxides of trivalent rare earths, oxides of alkaline-earth metals, and silica.

8. A process according to claim 7 wherein said support has been thermally stabilized by silica at a content of 1 to 5% by weight relative to the porous support.

9. A process according to claim 1, wherein said substrate is metal or ceramic.

10. A process according to claim 1, wherein said catalytic zone comprises several successive monoliths.

11. A process according to claim 1, wherein the downstream monolithic element is covered with a catalyst.

12. A process according to claim 11, wherein said catalyst that covers the monolithic element is a hexaaluminate.

13. A process according to claim 11, wherein said catalyst comprises a compound of formula $A_{(1-x)}B_yC_zAl_{(12-y-z)}O_{(19-\delta)}$, in which A represents at least one element of valence X that is selected from the group consisting of barium, strontium, and rare earths; B represents at least one element of valence Y that is selected from the group consisting of Mn, Co, and Fe; C represents at least one element that is selected from the group consisting of Mg and Zn; with x having a value of 0.01 to 3; the sum of y+z has a maximum value of 4 and δ has a value equal to 1½{(1−x)X+yY−3y−z}.

14. A process for the catalytic combustion of fuel with staged fuel injection that comprises: a first injection of fuel and air, the passage of the air-fuel mixture into a catalytic zone, and a second injection of fuel into the output gas from said catalytic zone at a location between the catalytic zone and a downstream monolithic element, said process being characterized in that said catalytic zone comprises several monoliths, with at least one catalyst comprising a monolithic substrate, a porous refractory inorganic oxide support and an active phase that comprises (I) cerium, iron, and zirconium, and (II) at least one metal selected from the group consisting of palladium and platinum; the content of the porous support is between 100 and 400 g per liter of catalyst; the cerium content is between 0.3 and 20% by weight relative to the porous support; the zirconium content is between 0.3 and 20% by weight relative to the porous support; the iron content is between 0.01 and 3.5% by weight of iron relative to the porous support; and the palladium and/or platinum content is greater than 3 g per liter of catalyst.

15. A process according to claim 14, wherein said downstream monolithic element is covered with a catalyst.

16. A process according to claim 15, wherein said catalyst that covers said monolithic element is a hexaaluminate.

17. A process according to claim 15, wherein said catalyst covering said downstream monolithic element comprises a compound of formula $A_{(1-x)}B_yC_zAl_{(12-y-z)}O_{(19-\delta)}$, in which A represents at least one element of valence X that is selected from the group consisting of barium, strontium, and rare earths; B represents at least one element of valence Y that is selected from the group consisting of Mn, Co, and Fe; C represents at least one element that is selected from the group consisting of Mg and Zn, with x having a value of 0 to 0.25, with y having a value of 0.5 to 3 and with z having a value of 0.01 to 3; the sum of y+z has a maximum value of 4 and δ has a value equal to 1½{(1−x)X+yY−3y−z }.

* * * * *